United States Patent [19]
Zimmerman

[11] 4,359,306
[45] Nov. 16, 1982

[54] SKID FOR STACKING HAY BALES

[76] Inventor: Lawrence Zimmerman, R.F.D. 2, New Richmond, Wis. 54017

[21] Appl. No.: 884,419

[22] Filed: Mar. 8, 1978

Related U.S. Application Data

[63] Continuation-in-part of Ser. No. 802,640, Jun. 2, 1977, abandoned.

[51] Int. Cl.³ .................. A01D 87/12; B65G 57/32
[52] U.S. Cl. ............................. 414/44; 414/58
[58] Field of Search ............ 214/6 B, 9, 152; 56/473.5, 474, 476, 480; 298/4; 414/44, 58, 111, 132, 786

[56] References Cited
U.S. PATENT DOCUMENTS

| 2,833,109 | 5/1958 | Walker | 56/473.5 |
| 2,948,420 | 8/1960 | Stoecker | 214/6 B |
| 3,080,071 | 3/1963 | Pratt et al. | 214/6 B |
| 3,158,270 | 11/1964 | Prentice | 214/6 B |
| 3,223,253 | 12/1965 | Garbe et al. | 214/6 B |

FOREIGN PATENT DOCUMENTS 242833 1/1963 Australia .................. 56/480

Primary Examiner—L. J. Paperner

[57] ABSTRACT

A skid for stacking hay bales discharged from a hay baler, suitable to be towed therebehind, having a platform near the front for the bale stacker to stand on, having at least four bale supporting arms extending rearwardly from the platform adapted to support the hay bales preferably in a pyramidal stack of six bales in a stable, rain-shedding position, in which the arms are arranged so that when the bales are stacked thereon, the center of gravity of each bale will be located toward the tall side of the stack and method of curing hay by stacking bales, even if moist, in pyramidal stack with the described orientation.

3 Claims, 3 Drawing Figures

SKID FOR STACKING HAY BALES

This application is a continuation-in-part of my earlier application Ser. No. 802,640, filed June 2, 1977 and now abandoned.

BACKGROUND OF THE INVENTION

Skid devices have been previously designed to be dragged behind a hay baler for the purpose of stacking hay bales into small stacks which are deposited in the field for further curing of the hay. This system of hay preparation enables baling of hay with as much as 40% moisture. The bales will go through a period of sweating for from two to five weeks but eventually dry out and remain dry.

This system enables any sweating or curing of the bales to occur in the field rather than in the barn thus avoiding discomfort to the worker and the hazards of possible spontaneous combustion. This system also enables baling of the hay without a final turning of the windrow and produces excellent quality baled hay. The method of this invention permits baling of hay of high moisture content which is dry by the wind even during periods of little sunlight, for example during October or November when a final crop of hay can often be harvested but not dried using conventional techniques.

It is an object of the present invention to provide an improved hay stacking sled which will provide six bale shocks of hay having improved stability even on steep hills. It is a further object of the invention to provide such device to provide such stacks which will stand in a rainproof fashion for drying of the hay. Further objects are to provide such a device which provides maximum safety and ease of operation. Another important objective is to provide a method of curing hay utilizing such device or similar devices for stacking bales in stable, weather-proof stacks wherein they will cure properly even under unfavorable weather conditions. It has been discovered that when hay is dried in stacks provided by the present invention, the hay dries without heating or sweating and that the protein in the hay then remains in a more readily available manner for bovine animal to digest. Moreover, it has been discovered that hay dried in accordance with the present invention contains a higher percentage of protein than hay prepared by previously used techniques apparently because it is baled in a more moist condition and thus loses less of the proteinaceous, leaves and tops than when baled in a drier more brittle condition.

Further advantages and objects of the invention will be apparent from the accompanying description and drawings, in which.

DESCRIPTION OF THE PREFERRED EMBODIMENT

Figure 1:
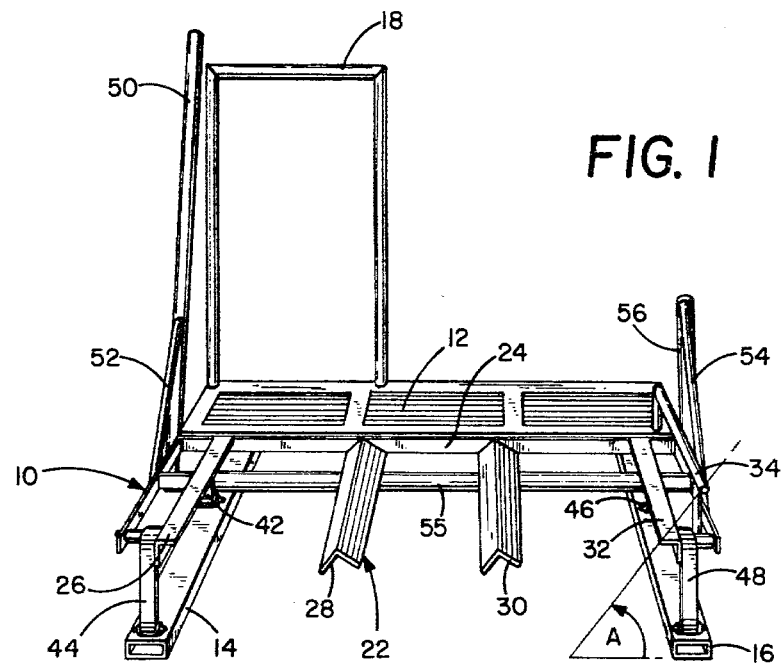
FIG. 1 is a perspective view of the rear of a skid device of the present invention.

Referring now to FIG. 1, numeral 10 indicates generally a skid in accordance with the invention. At the central front portion of the skid is a standard hitch means 11 (See FIG. 3) for attaching the skid to the rear of a hay baler. Numeral 12 indicates a platform area across the front portion of the skid upon which the operator may stand. 14 and 16 are skid runners suitable for dragging the skid along the ground. Affixed to the front of platform 12 by supporting posts at each end is a hand rail 18 by supporting posts on each end upon which the bale stacking worker may steady himself. The rail is offset to one side as shown so that the opposite side remains open to bales being pushed out of the bale shute of the baler.

As shown platform 12 is raised several inches above skids 14 and 16 by supporting members 18 and 20 and are welded into one solid unit. A bale-supporting assembly 22 is positioned adjacent to the rear of platform 12 and is made up of a crossmember 24 which is preferably of about equal length to the width of platform 12 together with a plurality of bale-supporting arms 26, 28, 30 and 32. In addition there is a supporting arm 34 which is positioned outwardly and above one of the outermost bale-supporting arms, in this case number 32. Arms 26 through 34 inclusive provide a device upon which the bale stacker can place the bales one at a time to form a stack or shock.

Figure 2:
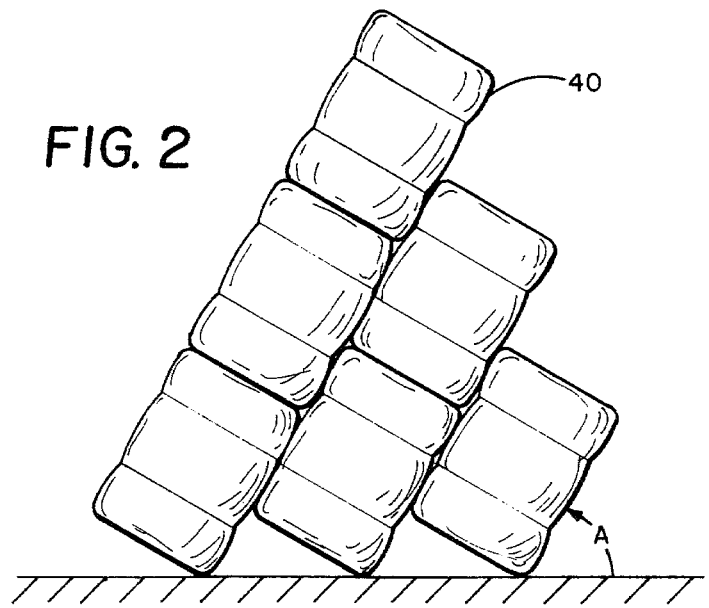
FIG. 2 is an end view of a stack of bales formed by the device.

Arms 32 and 34 are positioned so that angle A between a line drawn through the inner edge of said arms and the ground is at least 55°. If said angle exceeds 55°, the bales may be piled to form a stable shock 40 as shown in FIG. 2. As long as angle A exceeds 55° each bale within the shock will have its center of gravity to the left of center as shown in FIG. 2, i.e., the center of gravity will be positioned toward the tall side of the stack. As seen in FIG. 2, the stack is prevented from falling toward the tall side by the fact that the weight of the uppermost bales tends to push the stack in the opposite direction, i.e. toward the short side of the stack.

Figure 3:
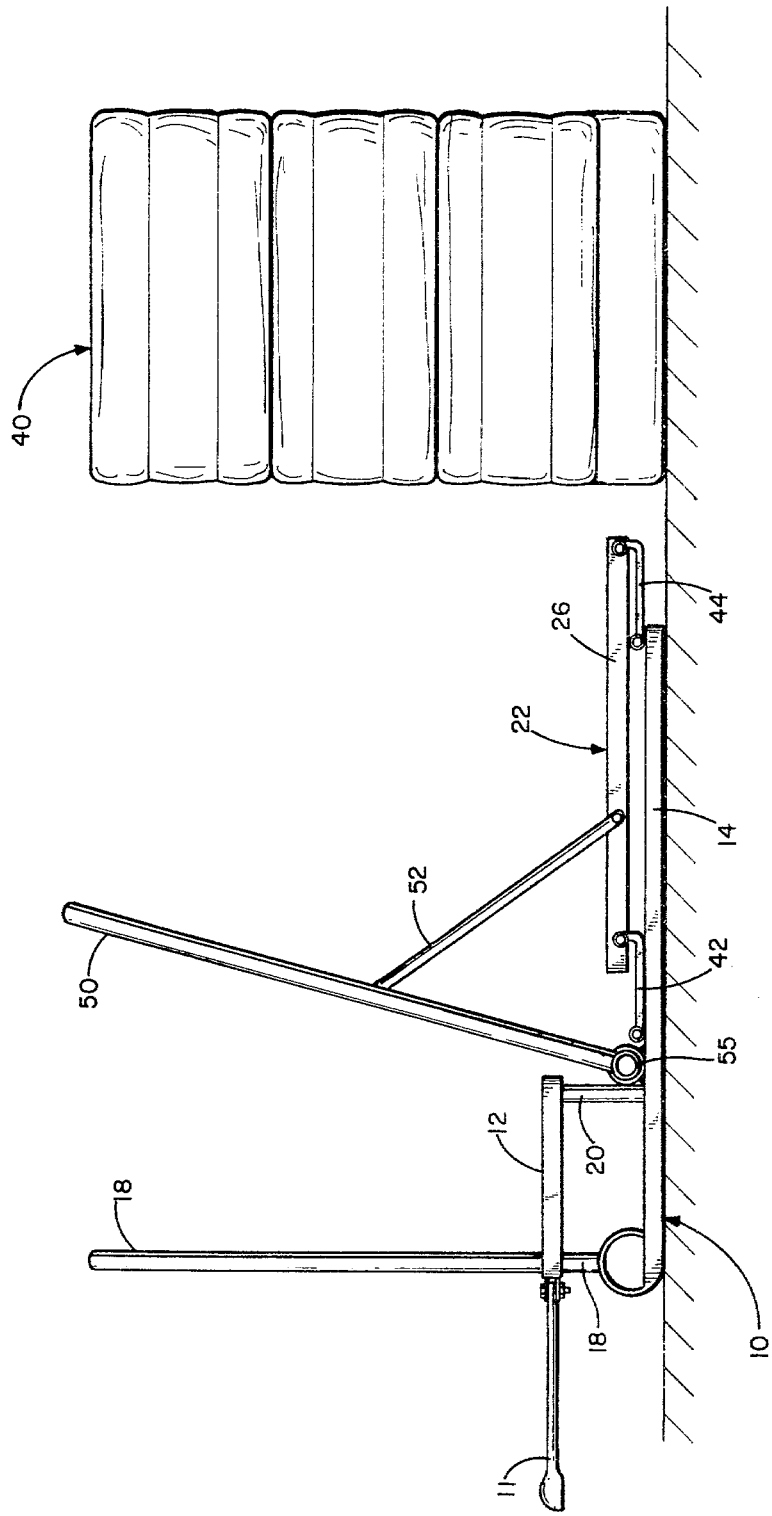
FIG. 3 is a side view of a device of the present invention together with a stack of bales deposited therefrom.

The bale-supporting assembly is pivotably attached to runners 14 and 16 by means of pivotable supporting elements 42, 44, 46 and 48. The latter supporting elements are attached in hinge fashion to runners 14 and 16 and to the outside of bale-supporting assembly 22. Pivotable lever arm 50 is provided to enable the bale stacker to lower the bale-supporting assembly after a six bale stack has been formed as shown in FIG. 3. Lever 50 is pivotably attached to runners 14 and 16 and also by means of connecting rod 52 to one side of the bale-supporting assembly 22.

One end of lever 50 is rigidly attached to crossmember or torsion bar 55. Member 55 provides a pivot for operation of lever 50. Rigidly affixed to the other end of pivot rod 55 is an up-right arm 56 to which is hingedly attached a second connecting rod 54 the opposite end of which is pivotably attached to assembly 22. This arrangement transmits the lowering and raising forces evenly to both sides of the bale-supporting assembly and permits the smooth lowering and raising of the assembly without twisting.

In operation the bale stacker who stands on platform 12 will stack six bales in the manner shown in FIG. 2, conventionally, the bales have a cross-section of approximately 14"×18". As indicated they are stacked so that the long edge is more or less upright. The first bale is laid against arms 30, 32 and 34 so that the long cross-sectional service of the bale will form an angle of at least 55° with the ground and preferably between 55° and 80°. The results in a stack of bales wherein the bottom of each bale forms an angle with the ground of 10° to 35°.

After the stack of six bales has been formed, the operator will push lever 50 to the position shown in FIG. 3 as the skid is dragged along. This causes the bale-supporting assembly to drop down to a height where the bales will contact the ground and the skid will be pulled out from under the shock which is left behind in the field to finish curing of the hay.

As indicated, angle A should be at least 55° because at lesser angles the stacked bales will tend to collapse to the right as viewed in FIG. 2. Optimum stacks are formed when the angle is between 55° and 80° in terms of stability of the stack even on steep hillsides. At angles greater then 80° there is a tendency for the stack to tip over to the left as viewed in FIG. 2.

Thus, it will be seen that by the present invention there is provided an efficiency economical device for stacking of hay ejected from a hay-baler which is economical to construct and operate. This device is the vehicle by means of which the method of stacking bales of the invention is performed.

The method of the present invention involves orienting an odd numbered plurality of bales in a row with an edge of each bale positioned at its lower-most position, each bale having a flat surface in contact with each of the adjoining bales, the axis of each bale being parallel to the ground and the bottom of each bale forming an angle with the ground of 10° to 35°, and the shortest sides of each bale being in the upper and lowermost position; positioning a second row of bales parallel and on top of said first row, the shortest sides of the bales in the second row being in direct face to face contact with the top sides of the bales in the first row, said second row having one less bale therein than said first row; stacking additional rows of bales in the same relationship over said second row with the uppermost row consisting of only one bale, and lowering the resulting pyramidal stack onto the ground to allow the same to dry by exposure to the elements.

EXAMPLE

High moisture content third crop hay was baled in Northern Wisconsin in mid-November in stacks as indicated. After 3 weeks curing in generally damp, cloudy weather conditions the hay was examined and found to be of excellent quality. The hay was found not to heat or sweat during curing. Protein content was analyzed to be 24%. 12% is considered to be a normal, good protein content for baled hay. It was of a type readily available to animals during digestion.

What is claimed is:

1. A hay bale stacking sled adapted to be dragged behind a hay baler comprising:
   (a) means for attaching said sled to the rear of said hay baler,
   (b) a transversely extending platform mounted on the forward portion of said sled for supporting a stacking operator thereon,
   (c) said platform being rigidly affixed to a runner on each side of said sled, said runners being parallel and each having an upwardly curved forward end to facilitate the dragging of the sled along the ground,
   (d) a bale-supporting assembly comprising, a transverse member adjacent the trailing edge of said platform, a plurality of bale-supporting arms extending rearwardly from said transverse member between said runners and adapted to support hay bales stacked thereon, a pair of parallel rearwardly extending frame elements positioned above said runners and connected to said transverse member, supporting elements pivotally connecting said frame elements to the front and rear of said runners to permit said assembly to be moved from a horizontal raised bale-carrying position to a horizontal lowered, bale-depositing position adjacent to the ground, means for raising and lowering said assembly,
   (e) a bale-positioning arm, said arm having one end connected to said platform and extending rearwardly therefrom, said bale-positioning arm being parallel and positioned above and outwardly from one of the rearwardly extending frame elements on one side of said bale-supporting assembly, the bale-positioning arm and said frame element being disposed relative to each other such that a line drawn between the inside edge of said arm and the inside edge of said rearwardly extending frame element forms an angle with the plane formed by the bottom surfaces of said runners of at least 55°, whereby the first bale to be loaded on the bale-supporting assembly by the operator is laid against one of the bale-supporting arms, the rearwardly extending frame element and the bale-positioning arm so that the long cross-sectional service of the bale will form an angle of at least 55° with the ground, a second row of bales being similarly laid against the first bale, and a third row of bales being similarly laid against the second row of bales, thereby forming a stack of bales wherein the bottom of each bale forms an angle of 10° to 35° with the ground to thereby provide a stable pyramidal stack while positioned on the bale-supporting assembly and when transferred to the ground.

2. A hay bale stacking sled according to claim 1, wherein the means for raising and lowering said assembly comprises, a pivot element extending transversely between said runners and rotatably attached to the top side thereof, a lever arm attached to said pivot element at one end thereof, and a connecting rod pivotally connected at one end to said bale-supporting assembly and at the other end to said lever arm, whereby the bale-supporting assembly is maintained horizontal during the raising and lowering thereof; a second lever arm rigidly attached to the other end of said pivot element, a second connecting rod having one end pivotally connected to said second arm, the other end of said second connecting rod being pivotally connected to said bale-supporting assembly, whereby the raising and lowering forces are uniformly transmitted between opposite sides of said bale-supporting assembly.

3. A hay bale stacking sled according to claim 1, wherein the angle of said line is between 55° and 80°.

* * * * *